No. 823,470. PATENTED JUNE 12, 1906.
T. HOLMES.
CONVEYER FOR RESTAURANTS.
APPLICATION FILED AUG. 21, 1903.

Witnesses:
Harry R. White.
Ray White.

Inventor:
Thorvald Holmes

UNITED STATES PATENT OFFICE.

THORVALD HOLMES, OF CHICAGO, ILLINOIS.

CONVEYER FOR RESTAURANTS.

No. 823,470.          Specification of Letters Patent.          Patented June 12, 1906.

Application filed August 21, 1903. Serial No. 170,356.

*To all whom it may concern:*

Be it known that I, THORVALD HOLMES, a citizen of the United States, residing at No. 984 North Kedzie avenue, Chicago, in the county of Cook and State of Illinois, have invented certain new and useful Improvements in Conveyers for Restaurants, of which the following is a specification.

My invention relates to improvement in restaurant service; and the object of my invention is to facilitate the serving of meals in restaurants and the dining-rooms of hotels.

I attain the objects by the use of certain new and novel features of construction and arrangement of parts that will be hereinafter more fully set forth, pointed out in the claims, and illustrated in the accompanying drawings, in which—

Figure 1:
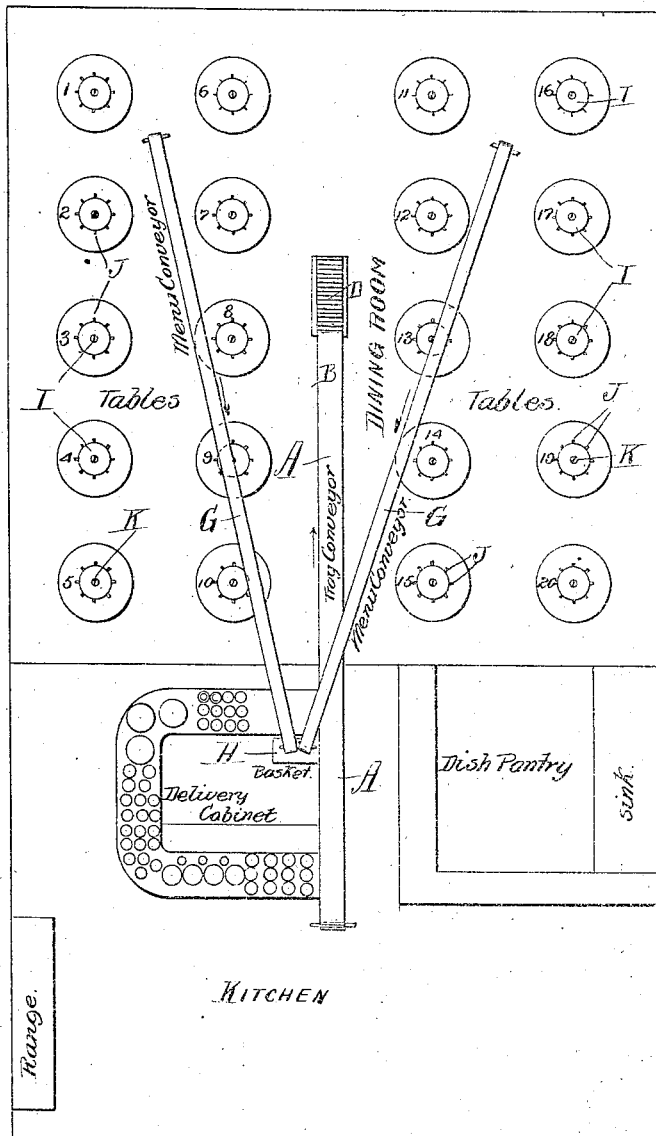
Figure 2:
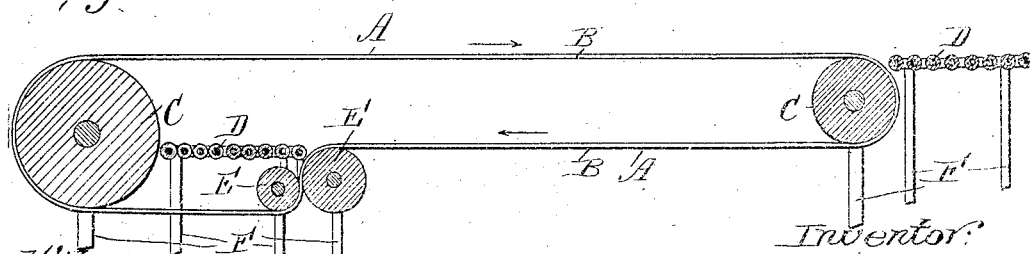

Figure 1 is a plan view of a dining-room and kitchen, showing the arrangement of the dining-tables, conveyers, and delivery-cabinet, as contemplated by my invention. Fig. 2 is a side elevation of the conveyer that carries the filled dishes from the kitchen to the dining-room and the empty dishes from the dining-room to the kitchen.

Referring in detail to the accompanying drawings, the conveyer A comprises a wide endless belt B, which travels over drums C C, one of which is arranged adjacent a delivery-cabinet in the kitchen and the opposite one at a suitable point, preferably in the center of the dining-room. The drum C in the kitchen is much larger than the drum in the dining-room, and these drums are so arranged as that the belt traveling from one to the other occupies a horizontal plane.

Arranged immediately in front of the drum C within the kitchen is a pair of small drums E, between which the belt passes in order to give it a downward turn before it passes onto the drum adjacent the delivery-cabinet.

Arranged between these drums E E and the drum C in the kitchen is a series of horizontally-arranged rollers that are in alinement with that portion of the belt that travels between the drum C in the dining-room and the first one of the drums E. A similar set of horizontally-arranged rollers D is positioned immediately in front of the drum C in the dining-room, which last-mentioned rollers are in horizontal alinement with the upper half of the belt as it travels from the drum in the kitchen to the drum in the dining-room.

The drums C and E and the two sets of rollers D are all journaled in a suitable framework that is supported by the legs F.

The conveyer is preferably arranged at about the same level as an ordinary dining-table, and said conveyer is so driven by any suitable means as that the upper portion thereof carries the dishes or trays on which said dishes are placed from the delivery-cabinet in the kitchen to the series of rollers D in the dining-room, and the lower portion of the belt carries the trays and dishes from the dining-room to the series of rollers D in the kitchen.

The menu-conveyers G G are endless belts and are arranged to travel around suitable rollers, and said conveyers are held supported overhead at a distance of about seven feet from the floor, and they are used for carrying menu-cards from the dining-room into the kitchen. The ends of these conveyers in the kitchen discharge into a suitable receptacle H, that is arranged in one corner of the delivery-cabinet.

The tables in the dining-room are consecutively numbered and are provided with revolving center pieces I, provided with cogs J, whereby said center pieces are rotated upon their pivots K. These center pieces are for the purpose of holding different table requisites, such as salt, pepper, vinegar, mustard, sugar, &c. The space between the center piece and the edge of the table is adapted to receive the dishes in which the food is placed, each particular set of dishes for the individual diners being preferably placed on suitable trays. (Not shown.)

The operation of my improved restaurant device is as follows: The patron upon entering the dining-room receives a menu-card containing the names of the dishes that are served and after checking off the dishes he desires hands the card to an attendant or waiter, who writes upon its face with a colored pencil the number of the table and the chair occupied by the patron. The attendant now places the card on one of the menu-conveyers, and it is carried thereby and delivered into the receptacle H within the delivery-cabinet in the kitchen. Here it is taken up by an operator in the delivery-cabinet, who notes the dishes desired by the patron and places said dishes upon a tray, to which is attached the menu-card, and then places said tray upon the top of the conveyer A. By this conveyer the tray is delivered to the series of rollers D within the dining-room, where it is taken up by the waiter, who observes the number of the chair and table written upon the menu-card, and thus said tray can be delivered to the proper patron. After finishing the meal the patron takes the menu-card to the cashier, and the marks thereon indicate the amount of the patron's bill, and when paid the card may be returned to the patron as a receipt and souvenir. After the patron has finished the meal the tray, with its contents, is removed from the table by a waiter and placed on the lower portion of the conveyer A and by means of the same is carried into the kitchen and delivered onto the series of rollers D in the kitchen, from whence it is removed by an attendant.

By the use of a restaurant device of my improved construction the number of attendants and the work required in serving patrons of a dining-room is greatly lessened, and the transferring of dishes to and from the dining-room can be accomplished much quicker and with much better results than where waiters are employed to carry the dishes back and forth.

I claim—

1. In a restaurant device, a conveyer arranged to transfer dishes from one part of the restaurant to the other, sets of horizontally-arranged rollers transversely arranged in front of the discharge ends of the conveyers, and similar conveyers leading from the dining-room to a predetermined point in the kitchen of the restaurant; substantially as specified.

2. In a restaurant device, a pair of drums suitably journaled at different points in the restaurant, an endless belt passing over said drums, a pair of small drums journaled so as to cause the belt to travel downwardly before passing onto one of the first-mentioned drums, sets of horizontally-arranged rollers transversely arranged in front of the discharge ends of the belt, and a pair of smaller conveyers leading from suitable points within the dining-room to a common point within the kitchen adjacent one of the discharge ends of the first-mentioned conveyers, substantially as specified.

THORVALD HOLMES.

Witnesses:
HARRY LEA DODSON,
W. L. BUCHANAN.